US009256951B2

United States Patent
Zagorchev et al.

(10) Patent No.: US 9,256,951 B2
(45) Date of Patent: Feb. 9, 2016

(54) SYSTEM FOR RAPID AND ACCURATE QUANTITATIVE ASSESSMENT OF TRAUMATIC BRAIN INJURY

(75) Inventors: Lyubomir Georgiev Zagorchev, Burlington, MA (US); Elizabeth Anne Morre, 's-Hertogenbosch (NL); Matthew A. Garlinghouse, Hanover, NH (US); Robert M. Roth, Hanover, NH (US); Thomas W. McAllister, Wilmot, NH (US); Reinhard Kneser, Aachen (DE); Dieter Geller, Aachen (DE); Jochen Peters, Norderstedt (DE); Juergen Weese, Aachen (DE); Yuechen Qian, Briarcliff Manor, NY (US)

(73) Assignee: Koninklijke Philips N.V., Eindhoven (NL)

( * ) Notice: Subject to any disclaimer, the term of this patent is extended or adjusted under 35 U.S.C. 154(b) by 166 days.

(21) Appl. No.: 13/514,713

(22) PCT Filed: Nov. 17, 2010 (Under 37 CFR 1.47)

(86) PCT No.: PCT/IB2010/055246
§ 371 (c)(1),
(2), (4) Date: Jun. 8, 2012

(87) PCT Pub. No.: WO2011/070464
PCT Pub. Date: Jun. 16, 2011

(65) Prior Publication Data
US 2012/0327075 A1      Dec. 27, 2012

Related U.S. Application Data

(60) Provisional application No. 61/285,216, filed on Dec. 10, 2009.

(51) Int. Cl.
*G06T 7/00* (2006.01)
*G06T 17/30* (2006.01)
*G06T 19/20* (2011.01)

(52) U.S. Cl.
CPC .......... *G06T 7/0089* (2013.01); *G06T 7/0012* (2013.01); *G06T 2200/24* (2013.01); *G06T 2207/10081* (2013.01); *G06T 2207/30016* (2013.01)

(58) Field of Classification Search
CPC ....... G06T 17/00; G06T 19/20; G06T 7/0012; G06T 2207/30016
USPC ........................................................ 345/419
See application file for complete search history.

(56) References Cited

U.S. PATENT DOCUMENTS 6,483,506 B1 * 11/2002 Costabel ................... 345/419
7,087,008 B2 * 8/2006 Fox et al. .................... 600/13

(Continued)

FOREIGN PATENT DOCUMENTS

JP     2005169119 A    6/2005
JP     2005533549 A    11/2005

(Continued)

OTHER PUBLICATIONS

Ecabert et al, "Automatic Model-Based Segmentation of the Heart in CT Images", IEEE Transactions on Medical Imaging, vol. 27, No. 9, Sep. 2008, pp. 1189-1201.

(Continued)

*Primary Examiner* — Tize Ma

(57) ABSTRACT

A system and method for automatic segmentation, performed by selecting a deformable model of an anatomical structure of interest imaged in a volumetric image, the deformable model formed of a plurality of polygons including vertices and edges, displaying the deformable model on a display, detecting a feature point of the anatomical structure of interest corresponding to each of the plurality of polygons and adapting the deformable model by moving each of the vertices toward the corresponding feature points until the deformable model morphs to a boundary of the anatomical structure of interest, forming a segmentation of the anatomical structure of interest.

20 Claims, 3 Drawing Sheets

(56) References Cited

U.S. PATENT DOCUMENTS

| | | |
|---|---|---|
| 7,231,076 B2 * | 6/2007 | Fu et al. ............... 382/131 |
| 7,270,846 B2 | 9/2007 | Shigemura et al. |
| 7,538,764 B2 * | 5/2009 | Salomie ............... 345/420 |
| 2002/0193687 A1 * | 12/2002 | Vining et al. ........... 600/425 |
| 2003/0036083 A1 | 2/2003 | Tamez-Pena et al. |
| 2003/0160786 A1 * | 8/2003 | Johnson ............... 345/419 |
| 2005/0244036 A1 | 11/2005 | Rusinek et al. |
| 2006/0002632 A1 * | 1/2006 | Fu et al. ............... 382/294 |
| 2006/0094951 A1 * | 5/2006 | Dean et al. ............ 600/407 |
| 2006/0215889 A1 * | 9/2006 | Omi et al. ............. 382/128 |
| 2006/0290695 A1 * | 12/2006 | Salomie ............... 345/420 |
| 2007/0014457 A1 | 1/2007 | Jolly et al. |
| 2007/0185544 A1 * | 8/2007 | Dawant et al. .......... 607/45 |
| 2008/0279429 A1 | 11/2008 | Fradkin et al. |
| 2009/0092301 A1 * | 4/2009 | Jerebko et al. ......... 382/128 |
| 2009/0128553 A1 * | 5/2009 | Perry et al. ............ 345/419 |
| 2009/0220136 A1 * | 9/2009 | Bova et al. ............ 382/131 |
| 2010/0106002 A1 * | 4/2010 | Sugiyama et al. ....... 600/410 |
| 2010/0261526 A1 * | 10/2010 | Anderson et al. ....... 463/31 |
| 2010/0312094 A1 * | 12/2010 | Guttman et al. ........ 600/411 |
| 2011/0282473 A1 * | 11/2011 | Pavlovskaia et al. .... 700/98 |
| 2012/0027278 A1 * | 2/2012 | Chaney et al. ......... 382/131 |

FOREIGN PATENT DOCUMENTS

| | | |
|---|---|---|
| KR | 2006110456 A | 10/2006 |
| WO | 2007057845 A1 | 5/2007 |
| WO | 2008152555 A2 | 12/2008 |
| WO | 2009065079 A | 5/2009 |

OTHER PUBLICATIONS

Elnakib et al, "Medical Image Segmentation: A Brief Survey", Modality State-Of-The-Art Medical Image Segmenationa and Registration Methodologies, Jan. 1, 2011, pp. A 1-39.

Weese, J. et al. "Shape constrained deformable models for 3D medical image segmentation", Image Processing in Medical Imaging (IPMI), vol. 2082 of LNCS, pp. 380-387. Springer, Jun. 2001.

Naidich, T.P. et al. "Hippocampal formation and related structures of the limbic lobe: anatomic-MR correlation,I: surface features and coronal section." Radiology 1987; 162:747-754.

Zola_Morgan, S. et al. "Human amnesia and the medial temporal region: enduring memory impairment following a bilateral lesion limited to field CA1 of the hippocampus." J Neurosci 1986; 6:2950-2967.

Kim, J. et al.. (2008). "Structural consequences of diffuse traumatic brain injury: a large deformation tensor-based morphometry study". Neuroimage, 39(3), 1014-1026.

* cited by examiner

SYSTEM FOR RAPID AND ACCURATE QUANTITATIVE ASSESSMENT OF TRAUMATIC BRAIN INJURY

BACKGROUND

Traumatic Brain Injury (TBI) is one of the most common causes of long-term disability. Abnormality of several subcortical structures such as, for example, the corpus callosum, hippocampus, cerebellum, thalamus and caudate, have been associated with TBI. Thus, it is important to identify the neuropathology in individuals with TBI in 3D. However, methodological challenges have hampered previous studies from providing a clear pattern of structural atrophy following TBI.

SUMMARY OF THE INVENTION

A method for automatic segmentation, performed by selecting a deformable model of an anatomical structure of interest imaged in a volumetric image, the deformable model formed of a plurality of polygons including vertices and edges, displaying the deformable model on a display, detecting a feature point of the anatomical structure of interest corresponding to each of the plurality of polygons and adapting the deformable model by moving each of the vertices toward the corresponding feature points until the deformable model morphs to a boundary of the anatomical structure of interest, forming a segmentation of the anatomical structure of interest.

A system having a processor selecting a deformable model of an anatomical structure of interest imaged in a volumetric image, the deformable model formed of a plurality of polygons including vertices and edges and a display displaying the deformable model, wherein the processor further detects a feature point of the anatomical structure of interest corresponding to each of the plurality of polygons to deform the deformable model by moving each of the vertices toward the corresponding feature points until the deformable model morphs to a boundary of the anatomical structure of interest, forming a segmentation of the anatomical structure of interest.

A computer-readable storage medium including a set of instructions executable by a processor. The set of instructions operable to select a deformable model of an anatomical structure of interest imaged in a volumetric image, the deformable model formed of a plurality of polygons including vertices and edges, display the deformable member on a display, detect a feature point of the anatomical structure of interest corresponding to each of the plurality of polygons and adapt the deformable model by moving each of the vertices toward the corresponding feature points until the deformable model morphs to a boundary the anatomical structure of interest, forming a segmentation of the anatomical structure of interest.

DETAILED DESCRIPTION

Figure 1:
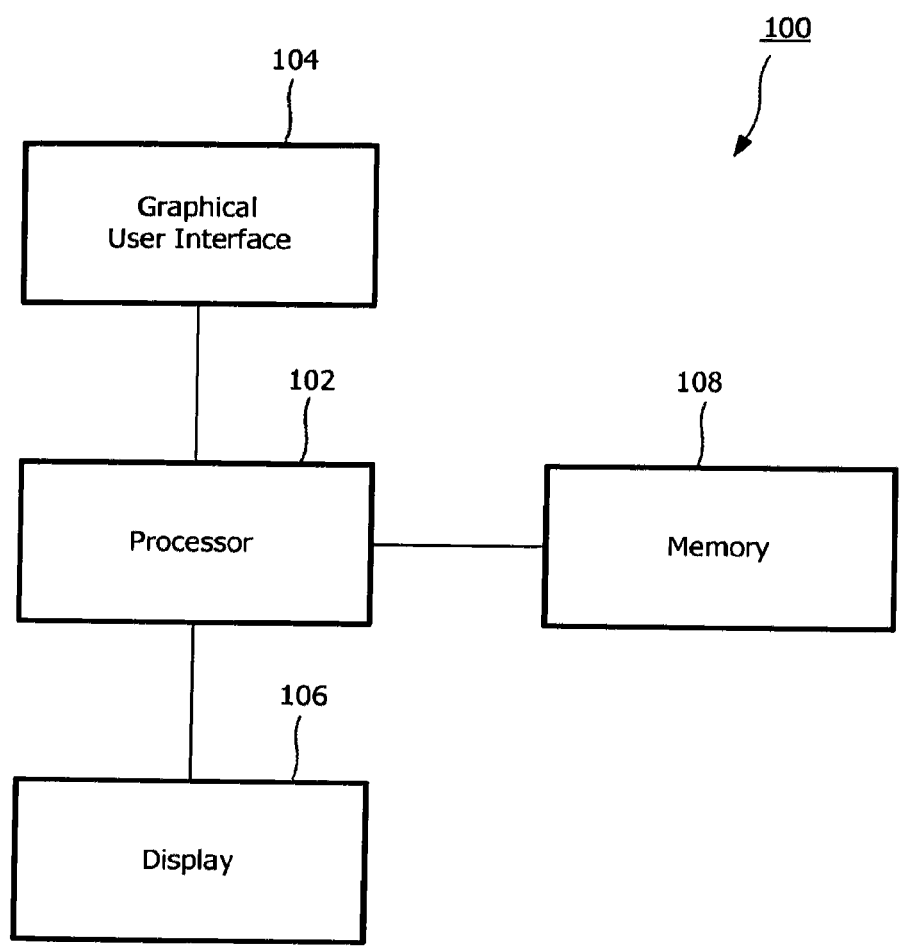
FIG. 1 shows a schematic diagram of a system according to an exemplary embodiment.

The exemplary embodiments may be further understood with reference to the following description and the appended drawings, wherein like elements are referred to with the same reference numerals. The exemplary embodiments relate to a system and method for segmenting brain structures. In particular, the exemplary embodiments generate a deformable model of the brain structure, which may be adapted to a volumetric image such as an MRI. It will be understood by those of skill in the art, however, that although the exemplary embodiments specifically describe segmenting brain structures, the system and method of the present invention may be used to segment any anatomical, 3-dimensional structure in a volumetric image such as, for example, an MRI and/or an ultrasound image.

As shown in FIG. 1, a system 100 according to an exemplary embodiment segments a 3D brain structure such as, for example, the corpus callosum, hippocampus, cerebellum, thalamus and caudate, of a volumetric image such as an MRI or an ultrasound image. The system 100 comprises a processor 102 that is capable of adapting a deformable model of the brain structure based on features of the structure in the image. The deformable model is selected from a database of models stored in a memory 108. A graphical user interface 104 is utilized to input user preferences to determine a volume of the brain structure, display a deformation of the brain structure, view a particular portion of the brain structure, etc. Inputs associated with the graphical user interface are entered via, for example, a mouse, a touch display and/or a keyboard. The segmentation of the brain structure, the volumetric image and user options of the graphical user interface 104 are displayed on a display 106. The memory 108 may be any known type of computer-readable storage medium. It will be understood by those of skill in the art that the system 100 is, for example, a personal computer, a server or any other processing arrangement.

Figure 2:
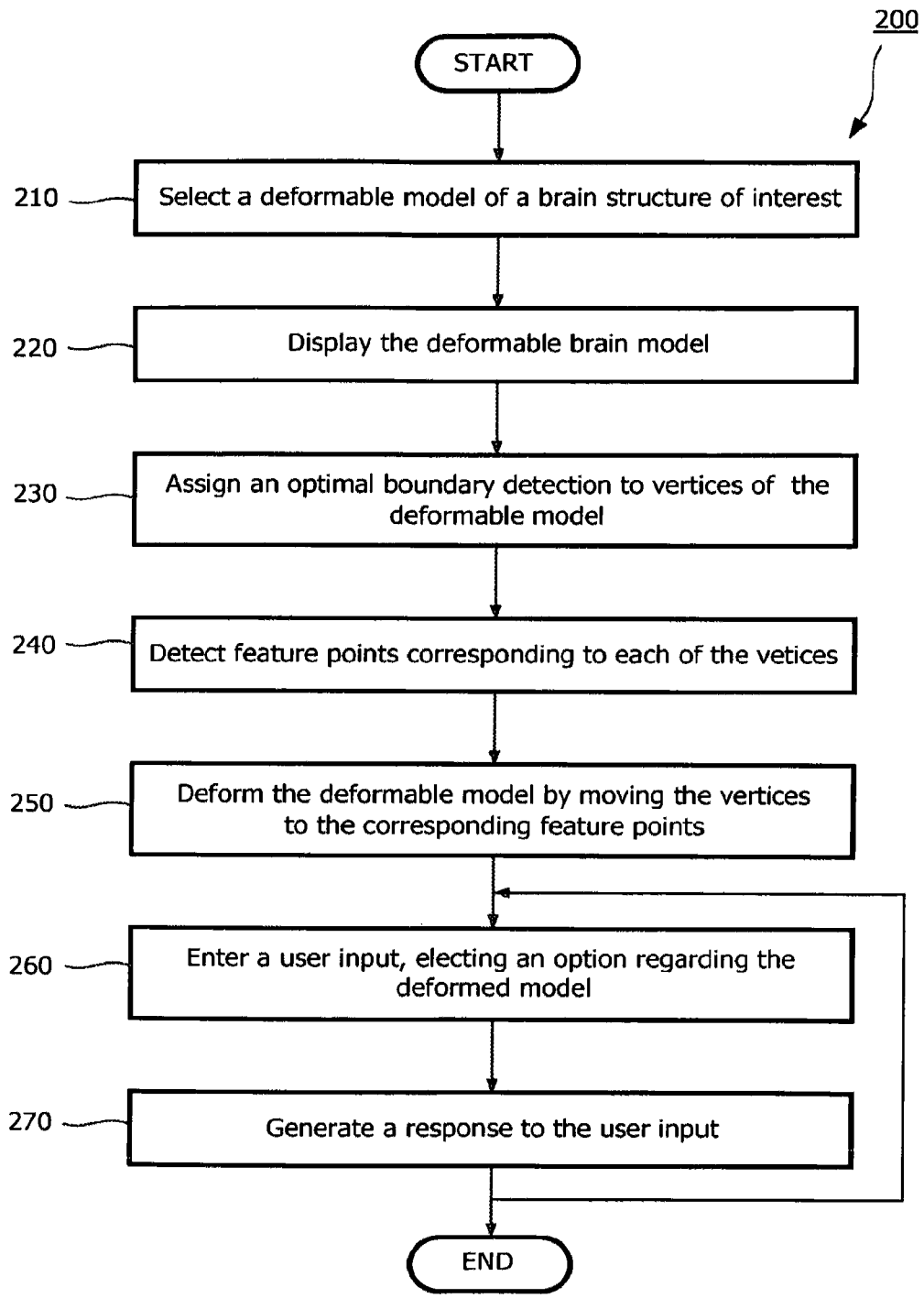
FIG. 2 shows a flow diagram of a method according to an exemplary embodiment.

FIG. 2 shows a method 200 according to an exemplary embodiment, in which the system 100 segments a brain structure to identify deformations in the brain structure. The method 200 includes selecting a deformable model of a brain structure of interest from a database of structure models stored in the memory 108, in a step 210. In an exemplary embodiment, the deformable model is automatically selected by the processor 102 by comparing features of the brain structure of interest in the volumetric image to the structure models in the database. In another exemplary embodiment, the deformable model is manually selected by the user browsing through the database to identify the deformable model that most closely resembles the brain structure of interest. The database of structure models may include structure models from brain structure studies and/or segmentation results from previous patients.

Figure 3:
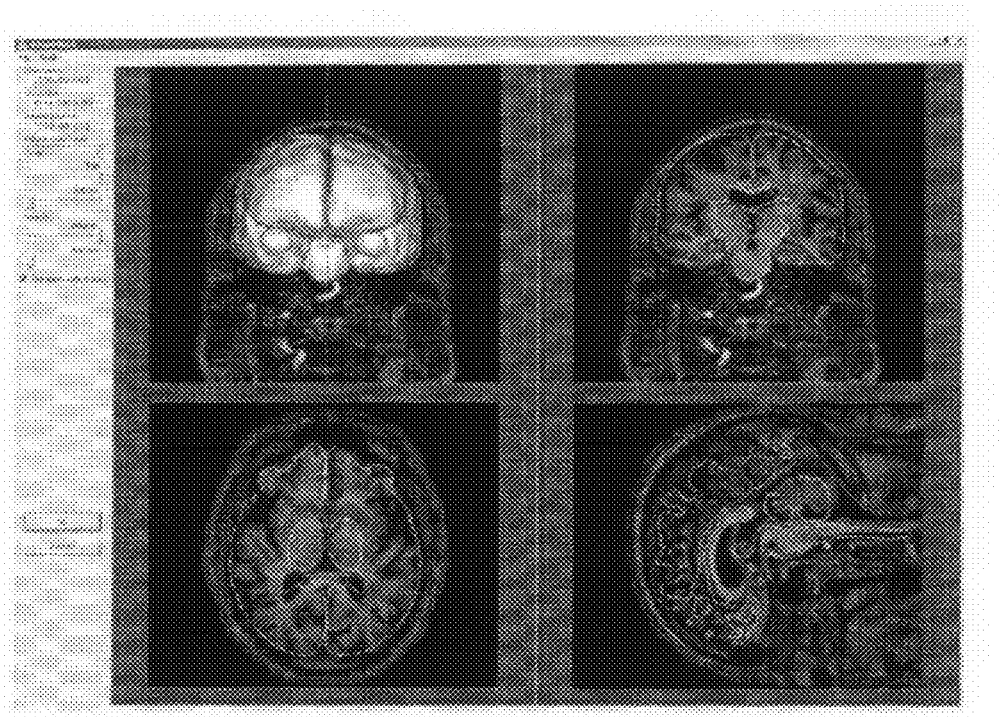
FIG. 3 shows a screenshot of a deformable brain model initialized in a volumetric image displayed on a GUI.

In a step 220, the deformable model is displayed on the display 106, as shown in FIG. 3. The deformable model is be displayed as a new image and/or displayed over the volumetric image. The deformable model is formed of a surface mesh including a plurality of triangularly shaped polygons, each triangularly shaped polygon further including three vertices and edges. It will be understood by those of skill in the art, however, that the surface mesh may include polygons of other shapes. The deformable model is positioned such that the vertices of the deformable model are positioned as closely as possible to a boundary of the structure of interest. In a step 230, each of the triangular polygons is assigned an optimal boundary detection function. The optimal boundary detection function detects feature points along a boundary of the structure of interest so that each of the triangular polygons is associated with a feature point, in a step 240. The feature points may be associated with centers of each of the triangular polygons. The feature point associated with each of the triangular polygons may be the feature point that is closest to the triangular polygon and/or corresponds to the triangular polygon in position.

Figure 4:
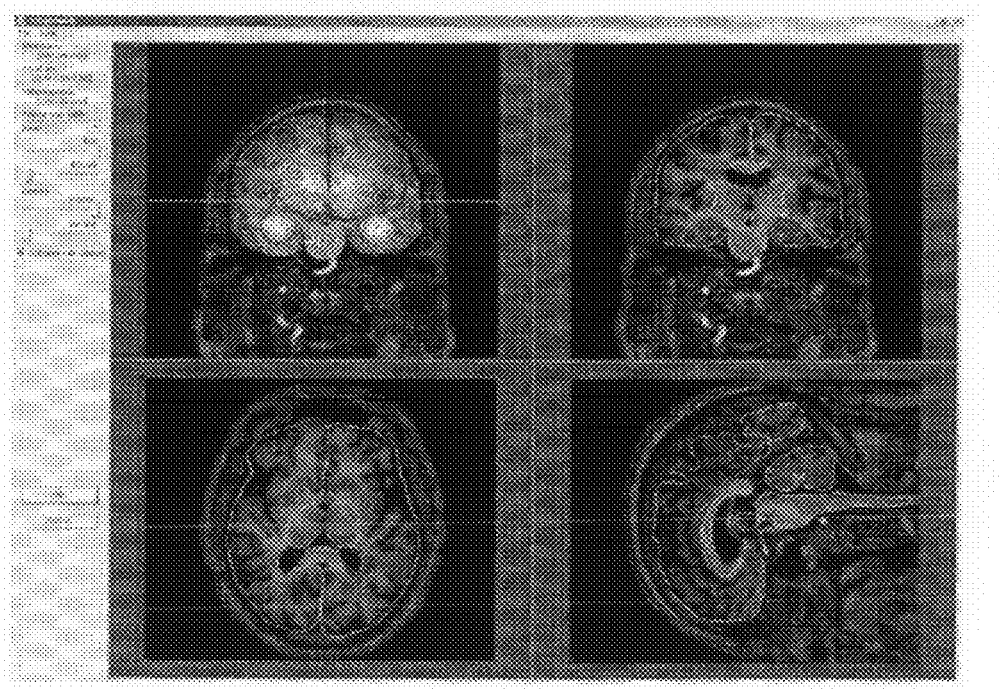
FIG. 4 shows a screenshot of the deformable brain model of FIG. 3 after it has been adapted to the volumetric image.

In a step 250, each of the triangular polygons associated with a feature point is moved toward the associated feature point such that vertices of each of the triangular polygons are moved toward the boundary of the structure of interest, deforming the deformable model to adapt to the structure of the interest in the volumetric image. The deformable model is deformed until a position of each of the triangular polygons corresponds to a position of the associated feature point and/or the vertices of the triangular polygon lie substantially along the boundary of the structure of interest, as shown in FIG. 4. Once the deformable model has deformed such that the triangular polygons correspond to the associated feature points of the boundary of the structure of interest, the deformable model has been adapted to the structure of interest such that the deformed deformable model represents a segmented structure of the structure of interest.

Upon completion of the segmentation process, the user may enter a user input, in a step 260, regarding the segmented brain structure. The user input may be entered via the graphical user interface 104, electing a user option, which may be displayed on the graphical user interface 104. For example, the user may elect to enlarge and/or zoom into a particular portion of the displayed images, change a view of a particular image, determine parameters of interest (e.g., segmented structure volume, curvature at a point), identify a deformation in the segmented structure, etc. Other options may include storing the segmented structure and/or the corresponding volumetric images in the database of deformable models or recalling previously stored segmented structures from the database for comparison purposes. It will be understood by those of skill in the art that the segmented structures and/or corresponding volumetric images may also be stored within patient files to facilitate analysis of structural atrophy in TBI patients.

The user may desire to determine the volume and/or curvature of the segmented structure to assess changes in the brain region. Such parameters may be especially useful in linking a patient's past exposure to TBI to current sustained complaints, deficits and disability. In addition, healthy brain structures are known to be symmetrical with respect to the mid-sagittal plane such that the left and right hemispheres of the brain are mirror images of one another. Thus, in a healthy brain, a vertex in one hemisphere of the brain—in the left hemisphere, for example—should be mirrored in the other hemisphere—the right hemisphere. TBI, however, is a mostly asymmetrical disease. Thus, deviations from mean vertex values represent variances that indicate a severity of deformation of brain structures of interest. The user may therefore elect to view the deviations from mean vertex values of the segmented structure. In a further embodiment, different deviations may be color-coded for easy visualization and interpretation of results.

In a step 270, the processor 102 generates a response to the user input entered in the step 260. For example, if the user has requested the segmented structure volume, the processor 102 will calculate the volume and display the volume on the display 106. If the user has indicated the user would like to enlarge a particular portion of the volumetric image and/or segmented organ, the processor 102 will generate and display an enlarged view of the particular portion desired. In another example, if the user has indicated that the user would like to identify deformations in the segmented structure, the processor 102 will identify a mid-sagittal plane, identify deviations in mean vertex values between the left and right hemispheres and display the deformations on the display 106. As described above, the different deviations may be color-coded. The steps 260-270 may be repeated as desired, until the user has elected all desired options in regard to the segmented structure of the brain.

It will be apparent to those skilled in the art that various modifications and variations can be made in the structure and methodology described herein. Thus, it is intended that the present disclosure cover any modifications and variations provided that they come within the scope of the appended claims and their equivalents.

It is also noted that the claims may include reference signs/numerals in accordance with PCT Rule 6.2(b). However, the present claims should not be considered to be limited to the exemplary embodiments corresponding to the reference signs/numerals.

What is claimed is:

1. A method for automatic segmentation, comprising:
   selecting a deformable model of an anatomical structure of interest imaged in a volumetric image, the deformable model formed of a plurality of polygons including vertices and edges;
   displaying the deformable model on a display;
   detecting a plurality of feature points of the anatomical structure of interest, each of the plurality of feature points corresponding to each of the plurality of polygons; and
   adapting the deformable model by moving each of the polygons toward the corresponding feature point by moving the vertices of each polygon toward a boundary of the anatomical structure of interest, forming a segmentation of the anatomical structure of interest;
   wherein at least a portion of the anatomical structure of interest is a normally symmetrical structure, and the method includes:
      determining deviations from a mean vertex value relative to a mid-sagittal plane of the normally symmetrical structure to determine abnormality, and
      displaying the deviations to show a deformation in the normally symmetrical structure.

2. The method of claim 1, wherein the deformable model is selected from a database of structures stored in a memory.

3. The method of claim 1, wherein the feature points lie substantially along the boundary of the anatomical structure of interest.

4. The method of claim 1, further comprising receiving a user input via a graphical user interface, the user input selecting an option in regard to segmentation.

5. The method of claim 4, further comprising generating a response to the user input.

6. The method of claim 4, wherein the user input includes selection of one of: calculating a volume of the segmentation and determining a curvature at a selected point.

7. The method of claim 1, wherein the anatomical structure of interest is a brain region.

8. The method of claim 1, wherein different deviations are displayed in different colors.

9. A system, comprising:
   a processor selecting a deformable model of an anatomical structure of interest imaged in a volumetric image, the deformable model formed of a plurality of polygons including vertices and edges; and
   a display displaying the deformable model, wherein the processor:
   detects a plurality of feature points of the anatomical structure of interest, each of the plurality of feature points corresponding to each of the plurality of polygons,
   deforms the deformable model by moving each of the polygons toward the corresponding feature point by moving the vertices of each polygon toward a boundary of the anatomical structure of interest, forming a segmentation of the anatomical structure of interest,
wherein at least a portion of the anatomical structure of interest is a normally symmetrical structure, and the processor:
   determines deviations from a mean vertex value relative to a mid-sagittal plane of the normally symmetrical structure to determine abnormality
   the deviations to show a deformation in the normally symmetrical structure.

10. The system of claim 9, further comprising: a memory storing a database of structures from which the deformable model is selected.

11. The system of claim 9, wherein the feature points lie substantially along the boundary of the anatomical structure of interest.

12. The system of claim 9, further comprising: a graphical user interface receiving a user input selecting an option in regard to segmentation.

13. The system of claim 12, wherein the processor generates a response to the user input.

14. The system of claim 12, wherein the user input includes selection of one of: calculating a volume of the segmentation and determining a curvature at a selected point.

15. The system of claim 9, wherein the anatomical structure of interest is a brain region.

16. The system of claim 9, wherein the display displays different deviations in different colors.

17. A non-transient computer-readable storage medium including a set of instructions executable by a processor that cause the processor to:
   select a deformable model of an anatomical structure of interest imaged in a volumetric image, the deformable model formed of a plurality of polygons including vertices and edges;
   display the deformable member on a display;
   detect a feature point of the anatomical structure of interest corresponding to each of the plurality of polygons; and
   adapt the deformable model by moving each of the polygons toward the corresponding feature point by moving the vertices of each polygon toward a boundary of the anatomical structure of interest, forming a segmentation of the anatomical structure of interest;
wherein at least a portion of the anatomical structure of interest is a normally symmetrical structure, and the instructions cause the processor to:
   determine deviations from a mean vertex value relative to a mid-sagittal plane of the normally symmetrical structure to determine abnormality,
   the deviations to show a deformation in the normally symmetrical structure.

18. The medium of claim 17, wherein the anatomical structure of interest is a brain region.

19. The medium of claim 17, wherein different deviations are displayed in different colors.

20. The medium of claim 17, wherein the deformable model is selected from a database of structures stored in a memory.

* * * * *